United States Patent [19]

Stafford

[11] Patent Number: 5,799,435
[45] Date of Patent: Sep. 1, 1998

[54] LIVE BAIT BUCKET

[76] Inventor: H. Wayne Stafford, 558 Highway 468, Brandon, Miss. 39042

[21] Appl. No.: 925,936

[22] Filed: Sep. 8, 1997

[51] Int. Cl.$^6$ .................................................. A01K 97/05
[52] U.S. Cl. ............................................. 43/57; 261/121.2
[58] Field of Search ............................ 43/57; D22/136; 261/121.2

[56] References Cited

U.S. PATENT DOCUMENTS

| | | | |
|---|---|---|---|
| 2,244,457 | 6/1941 | Hartford | 43/56 |
| 2,303,757 | 12/1942 | Pierson | 261/121.2 |
| 2,674,574 | 4/1954 | Pettas | 261/121.2 |
| 3,136,087 | 6/1964 | Scroggins | 43/57 |
| 3,509,657 | 5/1970 | Bross | 43/57 |
| 3,711,986 | 1/1973 | Andersen | 43/57 |
| 4,146,989 | 4/1979 | Vanus et al. | 43/55 |
| 4,168,590 | 9/1979 | Beshoner | 43/55 |
| 4,829,698 | 5/1989 | McDonald | 43/57 |
| 5,100,543 | 3/1992 | Stauffer et al. | 210/169 |
| 5,172,511 | 12/1992 | Smith | 43/56 |
| 5,193,301 | 3/1993 | Figgins | 43/57 |
| 5,355,617 | 10/1994 | Maynard | 43/56 |
| 5,423,102 | 6/1995 | Madison | 15/22.2 |

Primary Examiner—Jack W. Lavinder
Attorney, Agent, or Firm—L. Jager Smith, Jr.

[57] ABSTRACT

A live bait bucket designed to oxygenate water in which fishing bait is kept, comprising an outer bucket and an inner bucket, the space therebetween forming an annular oxygen chamber wherein gaseous oxygen is placed. A removable bait container is designed to fit within the inner bucket. Piping and a pump are provided to circulate water through a filter and back into the annular oxygen chamber, where the water is cascaded over baffles to increase the contact with the gaseous oxygen. A valve is provided to permit injection of oxygen into the annular oxygen chamber. Carrying handles may be provided both on the outer bucket and on the removable bait container.

13 Claims, 5 Drawing Sheets

LIVE BAIT BUCKET

FIELD OF THE INVENTION

The present invention relates to a novel bait bucket used to maintain minnows or other live fishing bait for extended periods of time. The invention includes features to store gaseous oxygen and to mix the oxygen with water in which the live bait is contained.

BACKGROUND OF THE INVENTION

Fishermen who use live bait such as minnows or shrimp have long faced the problem of their bait succumbing in the container in which it is kept before it can be used. The problem is that the oxygen in solution in the water in which the bait is maintained becomes depleted, and the minnows or other bait asphyxiate. This problem becomes more acute in warmer weather, since the solubility of oxygen in water decreases appreciably as the water temperature rises. See *Marks' Standard Handbook for Mechanical Engineers* (9th ed. 1987) at page 6–7.

Customarily, fishermen purchase their live bait at a location remote from where the bait will be used. Depending on the water temperature, the size of the reservoir in which the bait are kept, and the agitation of the water, live bait may expire before the fisherman can get to his fishing location. In many cases, where the bait is kept in simple buckets, the oxygen content of the water will be below life-sustaining levels within a few minutes, precluding use of the live bait over the course of a fishing day.

In response to this problem, many devices have been invented which have as their aim the provision of an oxygenated environment for live bait. These devices can be generally grouped into two classes: those imparting atmospheric air into the water container, and those involving the use of purified oxygen. Devices in the former class are more numerous than the latter, and include U.S. Pat. Nos. 2,244,457 to Hartford, 3,509,657 to Bross, 3,711,986 to Andersen, 4,146,989 to Vanus et al., 4,829,698 to McDonald, and 5,193,301 to Figgins. Examples of devices designed to use purified oxygen are found in U.S. Pat. Nos. 3,136,087 to Scroggins and 5,355,617 to Maynard. Additionally, it is known to transport live bait in a sealed plastic bag or other sealed container partially filled with water, and having the balance of the volume of the container filled with purified oxygen.

Since atmospheric air only contains approximately 21 percent oxygen by volume, it is apparent that purified oxygen is a far more efficacious source than atmospheric air for imparting oxygen in solution to water to be used by live bait in a container. Unfortunately, the present art devices have drawbacks that limit their use. The live bait bucket oxygenator patented by Scroggins requires that the user flip the container periodically to return gaseous oxygen to a bubbler area. When the container has not been flipped, gaseous oxygen is available to the live bait to be nibbled from the top surface of the water. However, some bait, such as shrimp, will not nibble oxygen from the top of the water.

The device patented by Maynard is a container with essentially an inverted bucket inside in which a supply of gaseous oxygen is maintained. Maynard has no means of mixing or agitating the water with the oxygen supply, and once the available oxygen dissolved in the water has been depleted, the only means generally available to the bait to get the oxygen in the inverted bucket area is to nibble at the surface. As mentioned above, this means of supplying oxygen is not suited for all types of live bait.

The prior, known method of filling the open volume of a bait container with gaseous oxygen suffers from the same infirmities described above in conjunction with the Maynard device. Furthermore, when this method is used, upon the fisherman's first opening of the container to retrieve some bait, the oxygen is released from the container, and is no longer available to the bait.

Another means of providing oxygen to bait to be transported and used by fishermen involves the use of compressed oxygen cylinders or containers, from which oxygen can be periodically injected into the bait reservoir by one of any number of means. While this method may be effective, it requires the use of more costly apparatus, namely, a pressure vessel suitable to transport compressed gas. Moreover, such method may not efficiently use the oxygen.

Fishermen need a container for the transport of live bait that is relatively simple, and thus relatively inexpensive to produce. Such container needs to be capable of providing a sustaining oxygen supply for many hours to any number of aquatic species used as bait by sport fishermen. The container needs to permit easy access to the bait by the fisherman, allowing bait to be removed without interference from parts of the apparatus.

Accordingly, it is an object of the present invention to provide a live bait bucket suitable for the transport and storage of live fishing bait such as minnows and shrimp. A further object of the present invention is to provide a live bait bucket that permits easy access to the bait by the fisherman while he is fishing. It is a further object of the present invention to provide a live bait bucket that will oxygenate water in which the bait are kept. Still a further object of the invention is to provide a live bait bucket that is capable of imparting oxygen in solution to the water over many hours of time. Yet another object of the present invention is to meet the foregoing requirements with a relatively simple device, that is easily transportable, and relatively economical to produce.

The means used to accomplish the foregoing objects, and other objects, advantages and applications for the present invention will become apparent from the description of examples of the invention and drawings herein.

SUMMARY OF THE INVENTION

The present invention comprises an outer bucket and an inner bucket, defining therebetween an annular oxygen chamber in which gaseous oxygen is maintained. Inside the inner bucket is a removable bait container wherein the live bait is kept. The inner bucket and the bait container are filled with water. As will be described more fully below, the outer bucket, inner bucket and bait container are fitted with piping and other features that permit the water in the bait container to be circulated through the oxygen-containing annular chamber and back into the bait container.

The outer bucket and inner bucket are constructed of material that is relatively impervious to gaseous oxygen. In a first embodiment of the invention, the outer bucket and inner bucket are connected together at the top with a sealing flange assembly, as may be seen in the accompanying illustrations. The inner bucket is placed inside the outer bucket, and the space between the inner and outer buckets, which is the annular oxygen chamber, is sealed at the top with the sealing flange assembly. An oxygen fill valve is provided in the side of the outer bucket to facilitate introduction of oxygen into the annular oxygen chamber.

On the outside of the outer bucket may be mounted an electric pump, with or without a timer. The timer may be adjusted to regulate how frequently the pump comes on, and how long it runs when energized. The pump serves to circulate water through the annular oxygen chamber and the rest of the apparatus. Alternatively to the electric pump, a manual pump may be used. Any number of manual pumps may serve the function of circulating water, but a squeeze bulb with an integral check valve has been found to be among the simpler and least expensive manual pumps suitable for use. Any pumps used may be separate from the bait bucket, as opposed to being mounted thereon. If the pump is separate, the user may need to connect hoses to suction and return fittings on the bait bucket as appropriate before use.

The inner bucket is fitted with several appurtenances and is provided with a number of holes, or passages, to provide the water circulation and oxygenation functions. On the side of the inner bucket is a water outlet comprising a recess forming a suction filter chamber within which a suction filter is installed. Around the perimeter of the suction filter chamber are flanges positioned and adapted to hold a filter within the chamber. Suction piping is routed from the suction filter chamber to the outside of the outer bucket. A suction valve may be provided in the suction piping. The suction piping may be routed and connected to the pump attached to the outside of the outer bucket, or may be terminated in a fitting for attachment of a separate pump.

The discharge from the pump is routed to return piping. The return piping may be connected to the pump attached to the outside of the outer bucket, or may commence as a fitting for attachment of a separate pump. If the return piping is connected to an attached pump, the connection to the pump may be removable to permit charging of the annular oxygen space with oxygen. A return valve is provided in the return piping. The return piping runs into the annular oxygen chamber and to a U-tube oxygen seal on the inner bucket. The U-tube oxygen seal may be formed integrally with the inner bucket sidewalls, or may be attached to the outside of the inner bucket sidewalls. The lower end of the U-tube oxygen seal is located near the bottom of the inner bucket. The function of the U-tube oxygen seal is to prevent oxygen in the annular oxygen chamber from escaping when any of the piping is disconnected, and to prevent oxygen from backing through the piping and bubbling out the suction filter when the pump is not operating.

At the top of the U-tube oxygen seal, near the top of the annular oxygen chamber, is an outlet for the water circulated through the pump. Below the U-tube oxygen seal outlet and on the inside of the outer bucket is a series of water cascade baffles. The function of these baffles is to disperse the circulated water around the circumference of the outer bucket in smaller streams, thereby increasing the surface area of the water brought into contact with the gaseous oxygen in the annular oxygen space, and increasing the duration of contact time of the smaller streams with the gaseous oxygen. When the small streams of oxygenated return water have wended their way around and down the outside of the inner bucket, they are collected at the bottom of the outer bucket where static pressure forces the water back into the inside of the inner bucket through a water inlet passage in the bottom of the inner bucket.

The removable bait container is placed inside the inner bucket. The bait container may be fitted with a lid, and means for attaching a separate carrying handle. A separate hinged or removable access door may be provided in the lid of the bait container, such access door being large enough for the fisherman to reach into the container with his hand or a scoop or net to remove bait. The bait container is provided with a plurality of passages in its side to permit water to flow out of the bait container and into the suction filter in the side of the inner bucket. The bait container is also provided with a plurality of passages in its bottom to permit the oxygenated return water to enter the bait container.

In order to prevent oxygenated return water from short-circuiting directly back to the suction filter without passing through the bait container, the bait container is provided with a water diverter flange around the perimeter of the outside of its bottom. The water diverter flange creates a seal that forces the oxygenated return water to enter the bait container bottom water inlet passages.

Many fisherman customarily remove their live bait from transport containers and place it in perforated containers they place in the water body in which they are fishing. The natural oxygen supply in the water body will generally provide adequate oxygen to the live bait, provided adequate perforations are provided in the container so that sufficient circulation occurs. The removable bait bucket described herein may be similarly removed from the inner bucket and placed in the larger water body. The inlet and outlet passages in the bait container provide the circulation needed to bring an oxygen supply from the water body to the bait. The ability easily to move the bait to the larger water body allows fishermen to employ this custom without damaging the bait through unnecessary handling.

In use of the bait bucket described herein, the fisherman fills the inner bucket with water, preferably at least above the level of the top of the suction filter. With the annular oxygen chamber open to the atmosphere through the oxygen fill valve, static pressure will force water up into the annular oxygen chamber, displacing air through the oxygen fill valve. If the inner bucket is completely filled with water, all the air will be ejected from the annular oxygen chamber. Once the desired level of water is achieved, the fisherman connects the oxygen fill valve to a source of compressed oxygen, and backfills the annular oxygen chamber with oxygen. As the oxygen fills the annular oxygen chamber, the water in the chamber is forced out of the chamber and back through the inner bucket water inlet in the bottom of the inner bucket. When the desired level of oxygen in the annular oxygen chamber has been reached, the fisherman closes the oxygen fill valve and disconnects the oxygen supply from the oxygen fill valve. The return and suction valves are then opened, and static pressure will prevent the escape of the oxygen charge from the annular oxygen chamber. The removable bait container may be placed in the inner bucket before or after the oxygen charging operation.

A second embodiment of the invention involves a permanent oxygen chamber top in lieu of the sealing flange assembly described above. Because the normal use of the bait bucket will require that sediment and other foreign materials periodically be cleaned from the bottom of the outer bucket, in this embodiment, the outer bucket is provided with a removable bottom so that the fisherman can open and wash out the outer bucket and annular oxygen chamber. This function may be accomplished in the first embodiment described above by opening the seal flange assembly and removing the outer bucket. All the variations alluded to above concerning the first embodiment may be used with the second embodiment.

BRIEF DESCRIPTION OF THE DRAWINGS

The organization and manner of the structure and operation of the invention, together with further advantages thereof, may be best understood by reference to the following description, taken in connection with the accompanying drawings, wherein like reference numerals identify like elements, in which.

DETAILED DESCRIPTION OF SPECIFIC EMBODIMENTS OF THE INVENTION

Figure 1:
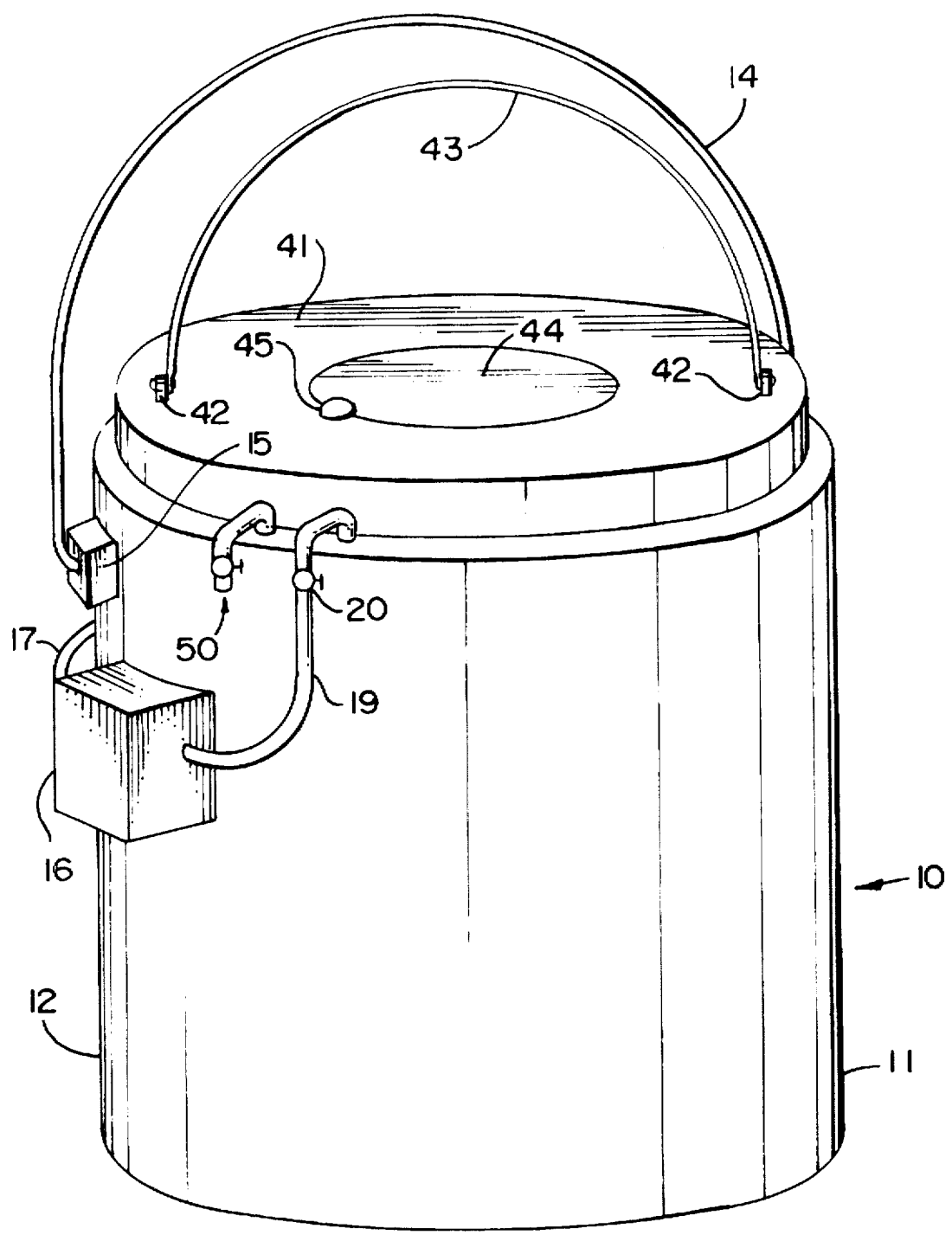
FIG. 1 is a perspective view of an embodiment of the invention with an externally mounted pump.

Referring now to the drawings, various embodiments of the bait bucket will be described. In FIG. 1, a perspective view of an embodiment of the bait bucket 10 is provided. The exterior of the bait bucket is the outer bucket 11, in which other elements described below are contained. On the side of the outer bucket 11 can be seen a representative pump 16. The pump may be permanently mounted onto the side 12 of the outer bucket, or it may be separate. If a manual pump is used, it may be most desirable to have the pump separate from the bait bucket. The preferred embodiment employs an electric pump powered by a 12 volt electrical source. In the preferred embodiment, the pump may be electrically connected to a 12 volt storage battery that may be used in conjunction with a boat motor. A timer may be provided integral to the pump housing to regulate the start and stop times and run duration of the pump, or such timer may be mounted separately on the side 12 of outer bucket 11. Also on the side 12 of outer bucket 11 can be seen oxygen fill valve 50, which terminates inside the annular oxygen chamber.

Suction piping 17 is seen in FIG. 1 coming from within the outer bucket 11 to pump 16. The routing of suction piping 17 may be seen more clearly in FIG. 2. Also connected to pump 16 is the return piping 19. The return piping 19 is connected to the discharge of pump 16. Pump 16 is preferably fitted with nipples for the connection of the suction piping 17 and the return piping 19. Within return piping 19 is a return valve 20. As described in the summary above, the fisherman connects a source of compressed oxygen to the oxygen fill valve 50. After charging with oxygen is complete, the oxygen fill valve is closed and its end may be plugged.

In FIG. 1 can also be seen the means for carrying the bait bucket 10. Supports 15 may be provided on the side 12 of outer bucket 11, to which may be attached outer bucket carrying handle 14. Another carrying handle may be provided for use in removing and carrying the removable bait container. The bait container carrying handle 43 may be attached to eyes 42 mounted on the top side 35 of bait container lid 41. A bait container access door 44 may be provided in the bait container lid 41 for easy access to the container contents. The access door may be provided with a hinge 45, or the door may be completely removable.

Figure 2:
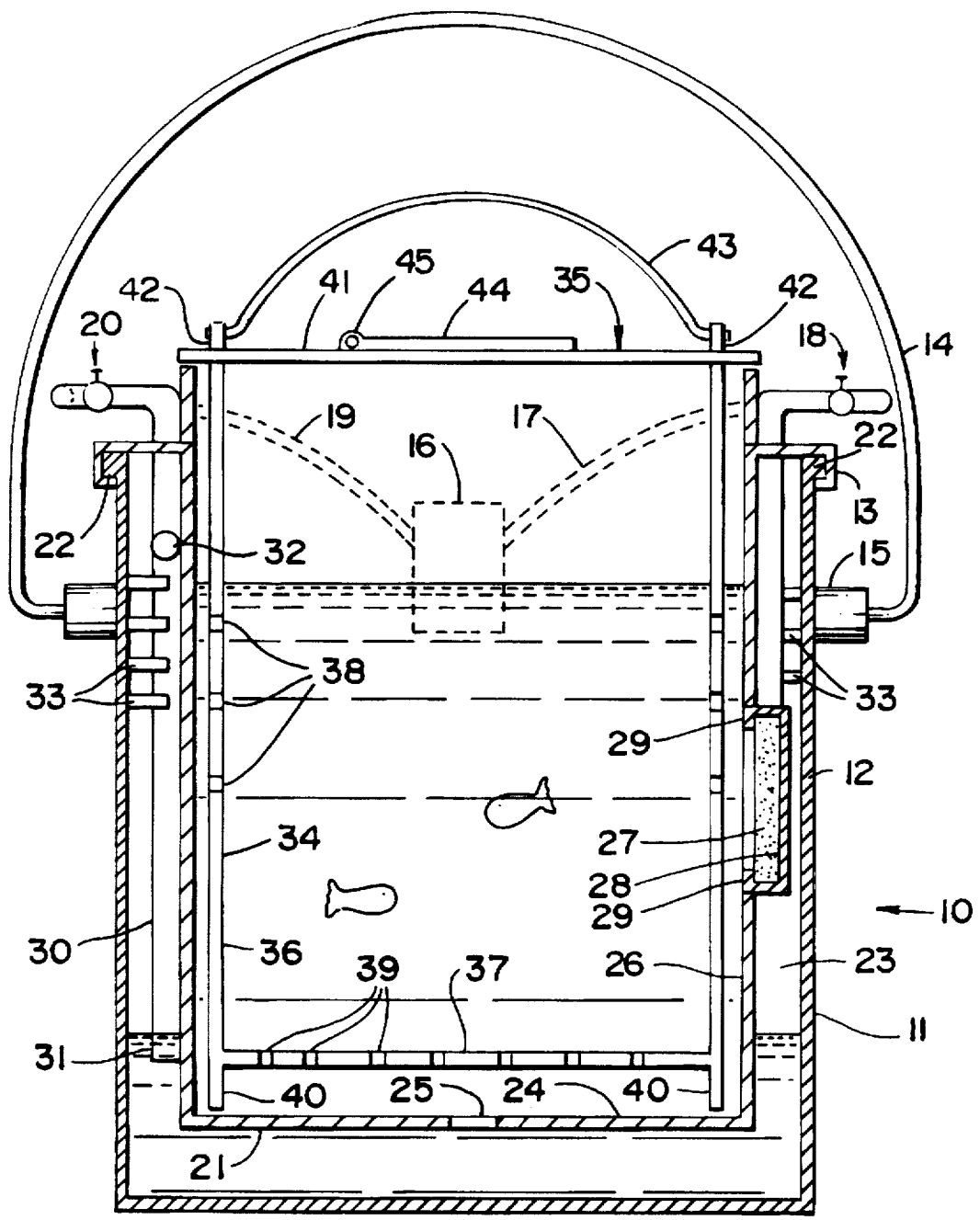
FIG. 2 is a section through a first embodiment of the invention.

Turning now to FIG. 2, a cross section through the center of an embodiment of the bait bucket 10 is shown. The outer bucket 11 is shown, within which is contained inner bucket 21. Between the side 26 of the inner bucket 21 and the side 12 of the outer bucket 11 is the annular oxygen chamber 23 which is filled with gaseous oxygen. The oxygen fill valve 50 shown in FIG. 1 is preferably mounted as high as possible toward the top of annular oxygen chamber 23. In this embodiment, a sealing flange 13 is provided at the top of the outer bucket 11, which cooperates with the inner bucket sealing rim 22 to seal the annular oxygen chamber 23. In the illustrated embodiment, the seal between the outer bucket 11 and inner bucket 21 is broken to take the buckets apart for cleaning purposes.

Pump 16 can be seen mounted on outer bucket side 12. Suction piping 17 and return piping 19 can be seen attached to pump 16. Water in the bait container 34 contains bait. In the sides 36 of the bait container 34 is a plurality of water outlet passages 38 that permit fluid communication between the contents of the bait container 34 and the inner bucket 21.

Formed in the side 26 of inner bucket 21 is a suction filter chamber 27. Within the suction filter chamber 27 is housed a suction filter 28, made of a porous material that will capture debris but still permit water flow. The size and pressure drop of suction filter 28 should be determined with reference to the flow and pressure characteristics of the selected pump. The suction filter 28 is held within suction filter chamber 27 by means of suction filter chamber flanges 29. The suction filter assembly is further illustrated in FIG. 4.

Figure 4:
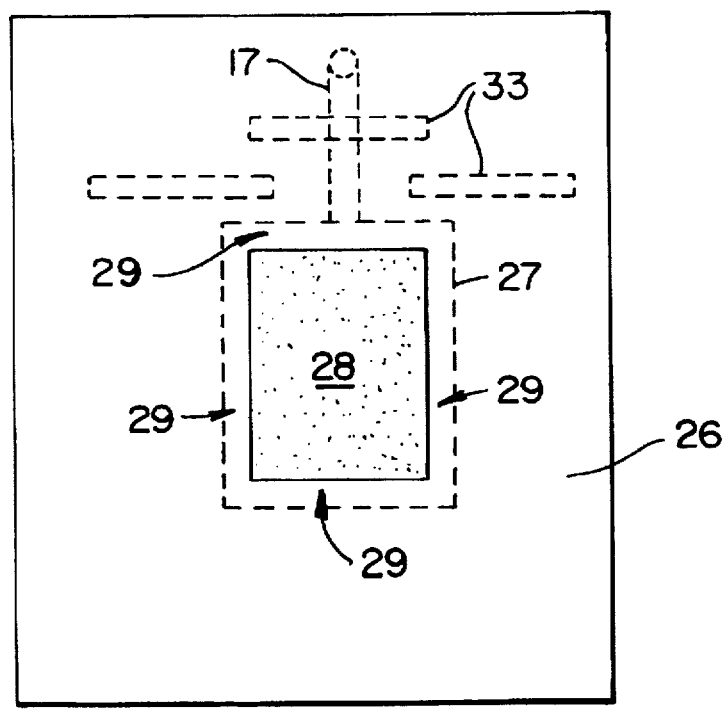
FIG. 4 is another elevation of the inner bucket showing the suction filter assembly.

When pump 16 is operating, the water in the bait container 34 flows out of the bait container 34 through the bait container side water outlet passages 38. This water flows through suction filter 28 and into suction piping 17, within which is provided suction valve 18 as shown in FIG. 2. The water passes from suction piping 17 through pump 16, and out through return piping 19, within which is provided return valve 20, also as illustrated in FIG. 2. In return piping 19 is formed a u-tube oxygen seal 30, whose lower end 31 is situated vertically near the bottom of the inner bucket 21. The circulating water passes out the outlet 32 of the u-tube oxygen seal 30, and is dispersed through the annular oxygen chamber 23, down and around the circumference of outer bucket 11, in small streams, by means of the water cascade baffles 33, which are also illustrated in FIG. 4. The outlet 32 of the u-tube oxygen seal should be located above the water cascade baffles 33. The number and placement of the water cascade baffles 33 can be modified as necessary to optimally distribute the water around and through the annular oxygen chamber 23, depending on the flow rate of the selected pump and the placement of the U-tube oxygen seal outlet 32.

Figure 3:
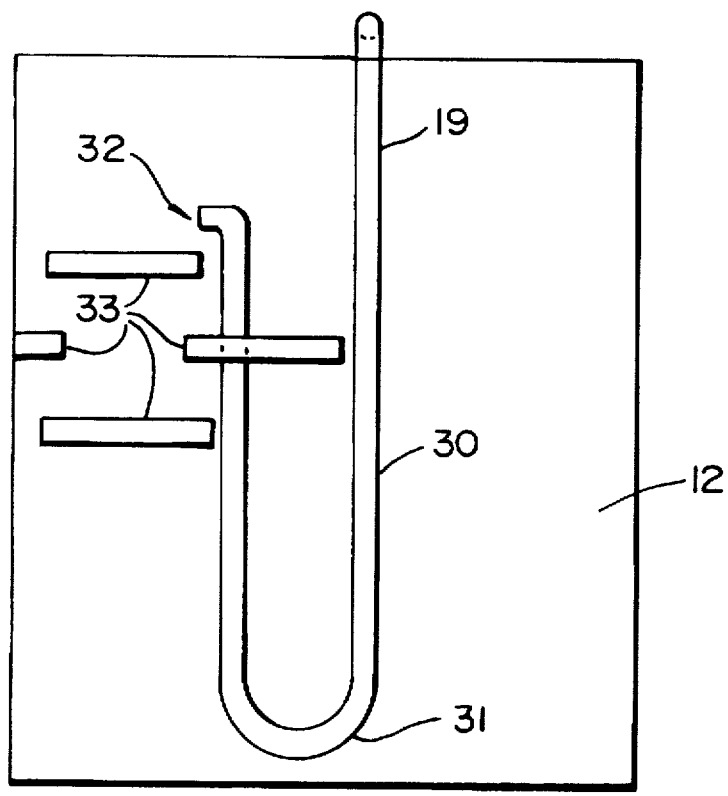
FIG. 3 is an elevation of the inner bucket showing the U-tube oxygen seal.

Turning now to FIG. 3, an elevation of the U-tube oxygen seal 30 formed in return piping 19 is shown. Outlet 32 is seen positioned above water cascade baffles 33. Water discharging from outlet 32 cascades down across baffles 33, which serve to increase the exposure of the water to the oxygen.

In FIG. 4 is shown an elevation of the suction filter chamber 27. Suction filter 28 is held in place by suction filter chamber flanges 29. Suction piping 17 is routed from the suction filter chamber 27 back to the pump as shown in FIG. 2.

Figure 5:
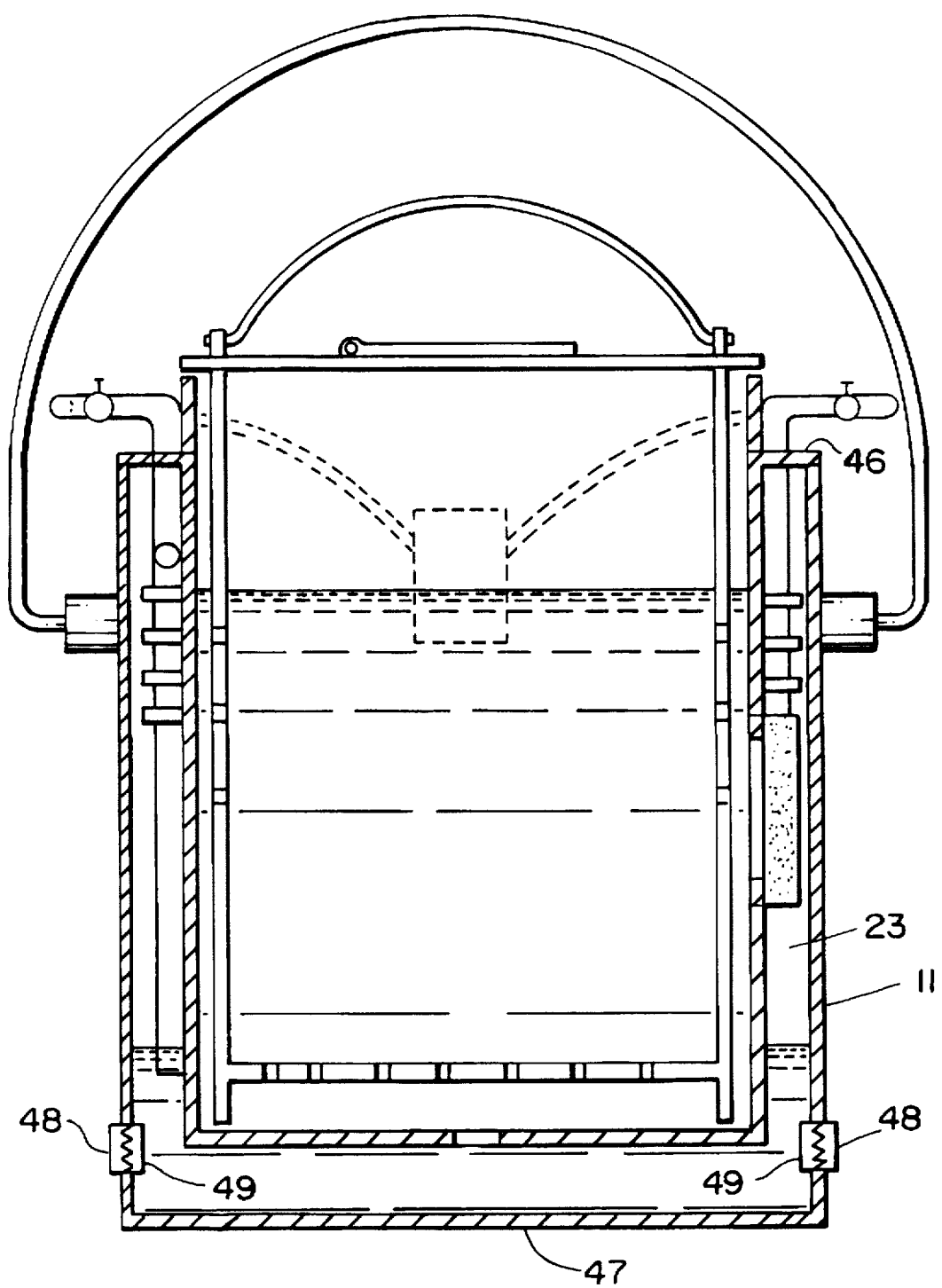
FIG. 5 is a section through a second embodiment of the invention using a outer bucket with a removable bottom.

FIG. 5 shows another embodiment of the invention. In this embodiment, in lieu of the sealing rim 22 and sealing flange 13 illustrated in FIG. 2, the annular oxygen chamber is provided with a fixed and sealed top 46. Outer bucket 11 is fitted with a removable bottom 47, which is provided with a threaded section 49 adapted to mate with a threaded portion 48 on the remainder of outer bucket 11. In this embodiment, removable bottom 47 is screwed off of outer bucket 11 to effectuate cleaning of the inside of the annular oxygen chamber 23.

From the foregoing detailed description of specific embodiments of the invention, it should be apparent that a novel and useful live bait bucket has been disclosed. While specific embodiments of the invention have been described in detail, it is to be understood that various alterations, substitutions and modifications can be made therein without departing from the spirit and scope of the present invention as defined in the appended claims.

I claim:

1. A live bait bucket, comprising:

(a) an outer bucket having an inside, an outside, and a bottom;

(b) an inner bucket residing within the outer bucket, having a side, and a bottom, the space between the inner bucket side and the outer bucket inside forming an annular oxygen chamber, and further having water outlet, and a water inlet passage in the bottom of the inner bucket;

(c) a removable bait container located within the inner bucket, having a side, a bottom and a lid, the removable bait container side and bottom being provided with a plurality of water passages therein, and a water diverter flange being attached to the bottom of the removable bait container;

(d) a pump mounted on the outside of the outer bucket;

(e) water cascade baffles mounted on the inside of the outer bucket;

(f) suction piping routed from the water outlet in the inner bucket to the outside of the bait bucket, and connected to the pump, and return piping connected to the pump and routed into the annular oxygen chamber, a U-tube seal being formed in the return piping, the U-tube seal having a bottom and an outlet, with the bottom of the U-tube seal located near the bottom of the inner bucket, and the outlet of the U-tube seal being located above the water cascade baffles.

2. The live bait bucket according to claim 1, wherein the water outlet in the inner bucket is a recess forming a suction filter chamber in the side of the inner bucket.

3. The live bait bucket according to claim 2, further comprising a suction filter mounted within the suction filter chamber.

4. The live bait bucket according to claim 2, wherein the suction filter chamber includes flanges around its perimeter adapted to hold a filter in place.

5. The live bait bucket according to claim 1, further comprising an oxygen fill valve mounted on the outside of the outer bucket, permitting fluid communication to the annular oxygen chamber.

6. The live bait bucket according to claim 1, wherein a sealing rim is provided on the outside of the outer bucket, and a sealing flange, formed to cooperatively engage with the sealing rim, is provided on the side of the inner bucket.

7. The live bait bucket according to claim 1, wherein the bottom of the outer bucket is removably connected to the side of the inner bucket.

8. The live bait bucket according to claim 7, wherein the bottom of the outer bucket is removably connected to the side of the inner bucket by means of a threaded connection.

9. The live bait bucket according to claim 1, further comprising shutoff valves within the return piping and suction piping.

10. The live bait bucket according to claim 1, further comprising a carrying handle mounted on the outside of the outer bucket.

11. The live bait bucket according to claim 1, further comprising a carrying handle mounted on the lid of the removable bait container.

12. The live bait container according to claim 1, further comprising an access door mounted within the lid of the removable bait container.

13. The live bait container according to claim 1, further comprising flanges around the perimeter of the suction filter chamber.

* * * * *